United States Patent
Ortiz

(10) Patent No.: US 9,048,720 B2
(45) Date of Patent: Jun. 2, 2015

(54) BIDIRECTIONAL MOTOR DRIVER LOW VOLTAGE POWER SUPPLY (LVPS)

(71) Applicant: Raytheon Company, Waltham, MA (US)

(72) Inventor: Joe Anthony Ortiz, Garden Grove, CA (US)

(73) Assignee: Raytheon Company, Waltham, MA (US)

( * ) Notice: Subject to any disclaimer, the term of this patent is extended or adjusted under 35 U.S.C. 154(b) by 211 days.

(21) Appl. No.: 13/855,298

(22) Filed: Apr. 2, 2013

(65) Prior Publication Data

US 2014/0292236 A1    Oct. 2, 2014

(51) Int. Cl.
*H02P 3/14* (2006.01)
*H02P 3/18* (2006.01)
*H02M 1/00* (2006.01)
*H02J 1/02* (2006.01)
*H02M 1/088* (2006.01)

(52) U.S. Cl.
CPC .. *H02M 1/00* (2013.01); *H02J 1/02* (2013.01); *H02M 1/088* (2013.01)

(58) Field of Classification Search
CPC ................................ H02M 1/088; H02J 1/102
USPC .......................................................... 318/376
See application file for complete search history.

(56) References Cited

U.S. PATENT DOCUMENTS

| | | | | |
|---|---|---|---|---|
| 5,109,185 A | * | 4/1992 | Ball | 323/207 |
| 5,428,523 A | * | 6/1995 | McDonnal | 363/71 |
| 2012/0049772 A1 | * | 3/2012 | Moussaoui et al. | 318/376 |
| 2013/0093241 A1 | * | 4/2013 | Lewis | 307/22 |

* cited by examiner

*Primary Examiner* — Erick Glass
(74) *Attorney, Agent, or Firm* — Schwegman Lundberg & Woessner, P.A.

(57) ABSTRACT

A bidirectional low voltage power supply (LVPS) for providing power to motor drive electronics. The bidirectional LVPS includes two simple, discrete converters. A first converter is used to provide power to an output and the second converter recycles power from the output to the power source. The first converter powers the drive electronics which drives the motor. During an operating process, the first converter shuts off and the second converter turns on to recycle power from the motor to the power source.

23 Claims, 14 Drawing Sheets

BIDIRECTIONAL MOTOR DRIVER LOW VOLTAGE POWER SUPPLY (LVPS)

GOVERNMENT RIGHTS

This invention was made with Government support under Contract Number [TBD] awarded by the Department of Defense. The Government has certain rights in this invention.

BACKGROUND

Motors can act as power sources in some operating conditions, during some part of their operating cycle. Therefore, motor driver electronics sinks power from the motor as well as source power to the motor. For example, regenerative braking as used in some electric vehicles uses the drive motors as generators to provide regenerative braking. The amount of braking is proportional to the power drawn from the motor. For maximum efficiency, the power drawn from the motor to provide braking is recycled back to the vehicle battery.

Another example includes cryogenic coolers. For some cryogenic coolers, the motors provide position control braking or temperature control by acting as a power source, absorbing energy from the fluid, and delivering electrical power, during some part of the operating cycle. The motor drive electronics of a cryogenic cooler system therefore not only sources power to the motor, but also sinks power from the motor.

Thus, in cryogenic cooler systems there is bidirectional power flow to and from the motors, and the motor drive electronics provides energy to the motors and receive energy from the motors during some part of the operating cycle. A small converter has been used in cryogenic cooler drive electronics to sink power from a motor and return power back to the source, for a motor that sourced power. However, the use of a small converter for sinking power from a motor is only useful in cryogenic cooler systems in which a motor is sourcing power, as the motor was in this example. In some cryogenic cooler systems, the energy is simply dissipated in a resistor or other load and converted to heat. Accordingly, the energy flow from the motor has not been effectively harnessed. As a result, the electrical energy is not stored or converted to any other type of work and is therefore wasted. To not waste this power sourced by the motor, it would be advantageous to use a bidirectional LVPS that can both provide power to the motor drive electronics and also sink power from the motor drive electronics, and return power to the power source.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
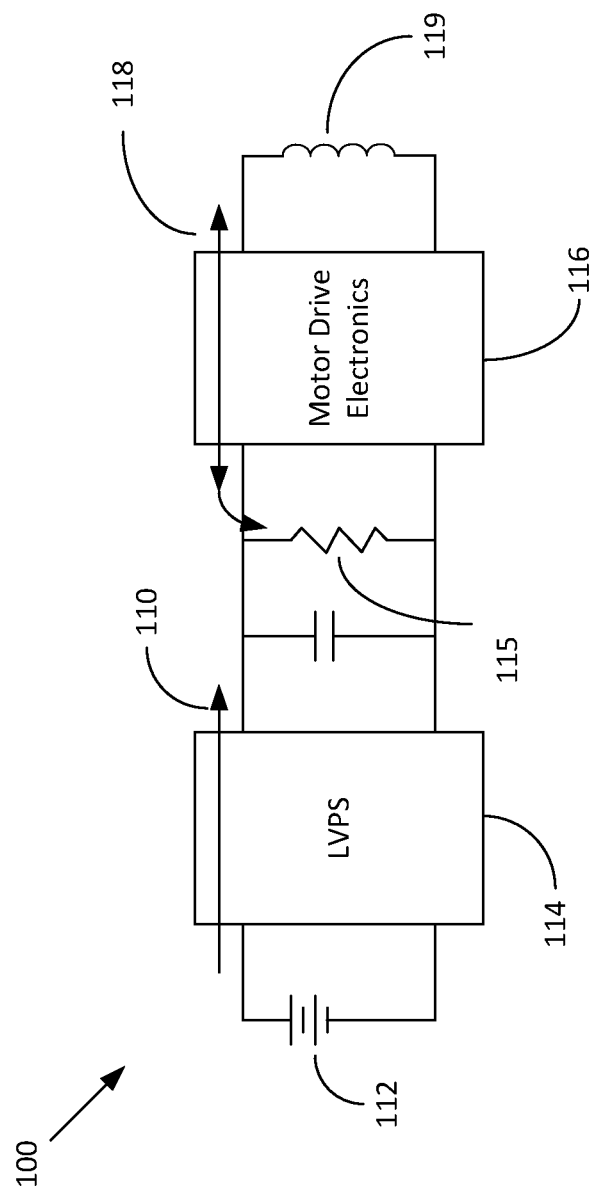
FIG. 1 shows a motor drive system wherein a unidirectional LVPS delivers power to the motor driver, but power sourced from the motor is dissipated in a resistive load.

A bidirectional low voltage power supply (LVPS) that provides power to the motor drive electronics recycles power back to the input power buss during the operating condition of the motor sourcing power, such as during the expansion cycle of a thermodynamic process. Most power supplies are not bidirectional and can only transfer power from the input of the power supply to the output of the power supply. A bidirectional power supply can transfer power from the input of the power supply to the output of the power supply, and from the output of the power supply back to the input of the power supply. However, while such bidirectional power supplies can be efficient, they have not historically been simple or small, and have thus not been used to recycle power in lower power applications such as cryogenic cooler motor drive electronics. Typically, power returned by the motor is not recycled, but is dissipated through a resistor or other load. To provide a bidirectional LVPS that is simple and small, two separate power converters are used, wherein the two power converters work alternately.

The bidirectional LVPS includes two simple converters. A first converter is used to provide power to the motor drive electronics and the second converter recycles power from the motor drive electronics to the power source. When the motor sources power, as during the expansion cycle, for example, the first converter shuts off and the second converter turns on to recycle power from the motor drive electronics to the power source. The error amplifier from the first converter may be used to enable the second converter.

The error amplifier of a power converter controls the power stage of the power converter to regulate the output power form, whether output voltage or output current is regulated, whether voltage mode control or current mode control is used. For example, the error amplifier may control the power stage of a power converter to provide a regulated converter output voltage. If the output voltage drops lower than a predetermined setpoint, the output of the error amplifier goes high to increase the output voltage. If the output voltage increases to higher than the predetermined setpoint, the output of the error amplifier goes low to decrease the output voltage. When the error amplifier output voltage drops sufficiently low, the converter shuts off. Thus, the error amplifier output voltage from the first converter may be used to enable the second converter.

In the bidirectional LVPS, when the cryogenic cooler motor is providing power back toward the power source, as when the coolant is expanding, the voltage at the output of the LVPS will begin to increase to a voltage greater than that to which the error amplifier in the first converter is set to regulate. The error amplifier of the first converter determines that the output voltage is too high and therefore drives a lower voltage at its output. The output of the error amplifier will drop to a minimum, typically 0 volts, and thereby turn off the power stage of the first converter, to stop providing current or voltage to the output. When the output of the error amplifier drops below the level to drive zero current or zero volts (typically 1 V), the second converter may be enabled to allow the second converter to recycle the power to the power source. This ensures that the first and second power converters are not on at the same time to prevent cycling of power in a loop between the first converter and the second converter. If the second converter is enabled at the same time as the first converter, the second converter can be recycling power from the output of the first converter back to the power source while the first converter is sourcing power from the power source to the motor drive electronics. Fewer parts are used, and less volume is used, by employing two separate, simple power converters than a single, more complex, bidirectional power converter. Also, two separate, simple power converters may take up less space than a single, more complex, bidirectional power converter.

Herein, embodiments may be explained in the context of providing and recycling power for a motor, e.g., cryogenic cooler motors. However, those skilled in the art will recognize that embodiments described herein may also be applicable to other implementations and therefore such examples are not meant to be limiting. Accordingly, other forms and/or representations may be practiced without departing from the scope of the embodiments described herein.

FIG. 1 shows a motor drive system 100 wherein a unidirectional LVPS 114 delivers power to the motor drive electronics 116 and power sourced from the motor is dissipated in a resistive load 115. In FIG. 1, the motor drive electronics 116 are powered through a low voltage power supply (LVPS) 114. A LVPS 114 may be omitted if the motor drive electronics 116 operate straight off the input buss power to drive the motor directly. In FIG. 1, unidirectional input power flow 110 is provided by an input power buss 112. A low voltage power supply (LVPS) 114 uses the input power buss 112 to provide power to the motor drive electronics 116. The LVPS 114 provides power to the motor drive electronics 116 that is isolated from the input power buss 112. Alternatively, the LVPS 114 may provide non-isolated power. The motor drive electronics 116 provides bidirectional power flow 118 for a motor 119. For example, cryogenic cooler motors may act as power sources in some operating conditions, e.g., during the expansion cycle when the coolant expands. Motor drive electronics 116 provides bidirectional power flow 118 for the motor 119 by sinking power from the motor 119 as well as sourcing power to the motor 119. To maintain regulation, power sourced from the motor 119 is dissipated in a load resistor 115. The resistance of the load resistor 115 is sufficiently low that LVPS 114 sources power.

For these applications, in which the motor drive electronics 116 operate off secondary power provided by an LVPS 114, a bidirectional LVPS (not shown) may source power and sink power, and recycle the sinked power back to the input power source. By recycling the power back to the input power source, system power dissipation is reduced and overall system efficiency may be improved. In addition, a LVPS bidirectional power converter for recycling power back to the input power may reduce thermal loading.

Figure 2:
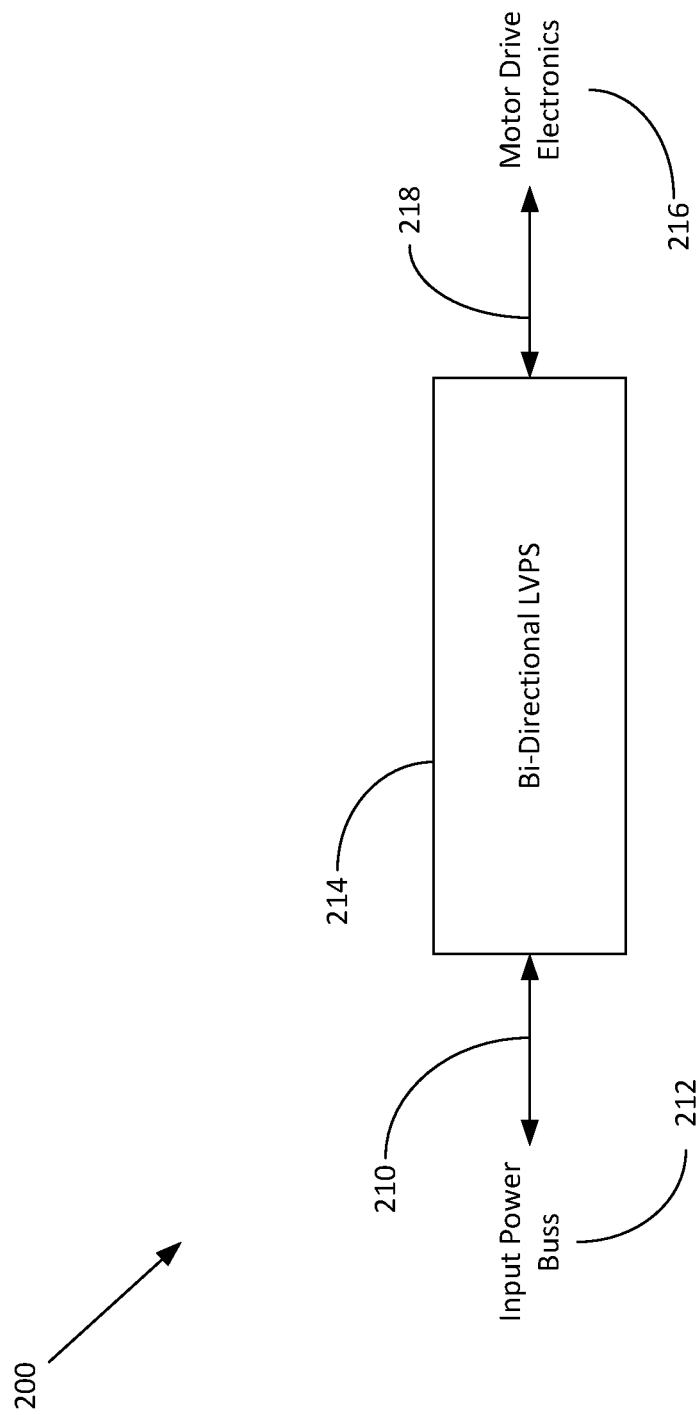
FIG. 2 illustrates a block diagram of a bidirectional LVPS wherein the LVPS can deliver power to the motor drive electronics, or sink power from the motor drive electronics and return power back to the source.

FIG. 2 illustrates a block diagram of a bidirectional power system 200 wherein the power system can deliver power to the motor drive electronics 216, or sink power from the motor drive electronics and return power back to the source. The bidirectional power converter 214 is coupled to an input power buss 212 to provide input power 210 to the bidirectional LVPS 214, wherein the bidirectional LVPS 214 then provides bidirectional input power flow 218 to the motor drive electronics 216. The LVPS 214 may provide power to the motor drive electronics 216 that is isolated from the input power buss 212. Alternatively, the LVPS 214 may provide non-isolated power. The motor drive electronics 216 provide bidirectional power flow 218 by sinking power from the motor as well as sourcing power to the motor. Power from the motor drive electronics 216 is provided to the bidirectional LVPS 214 for recycling back to the input power buss 212 to reduce system power dissipation and to improve overall system efficiency.

Figure 3:
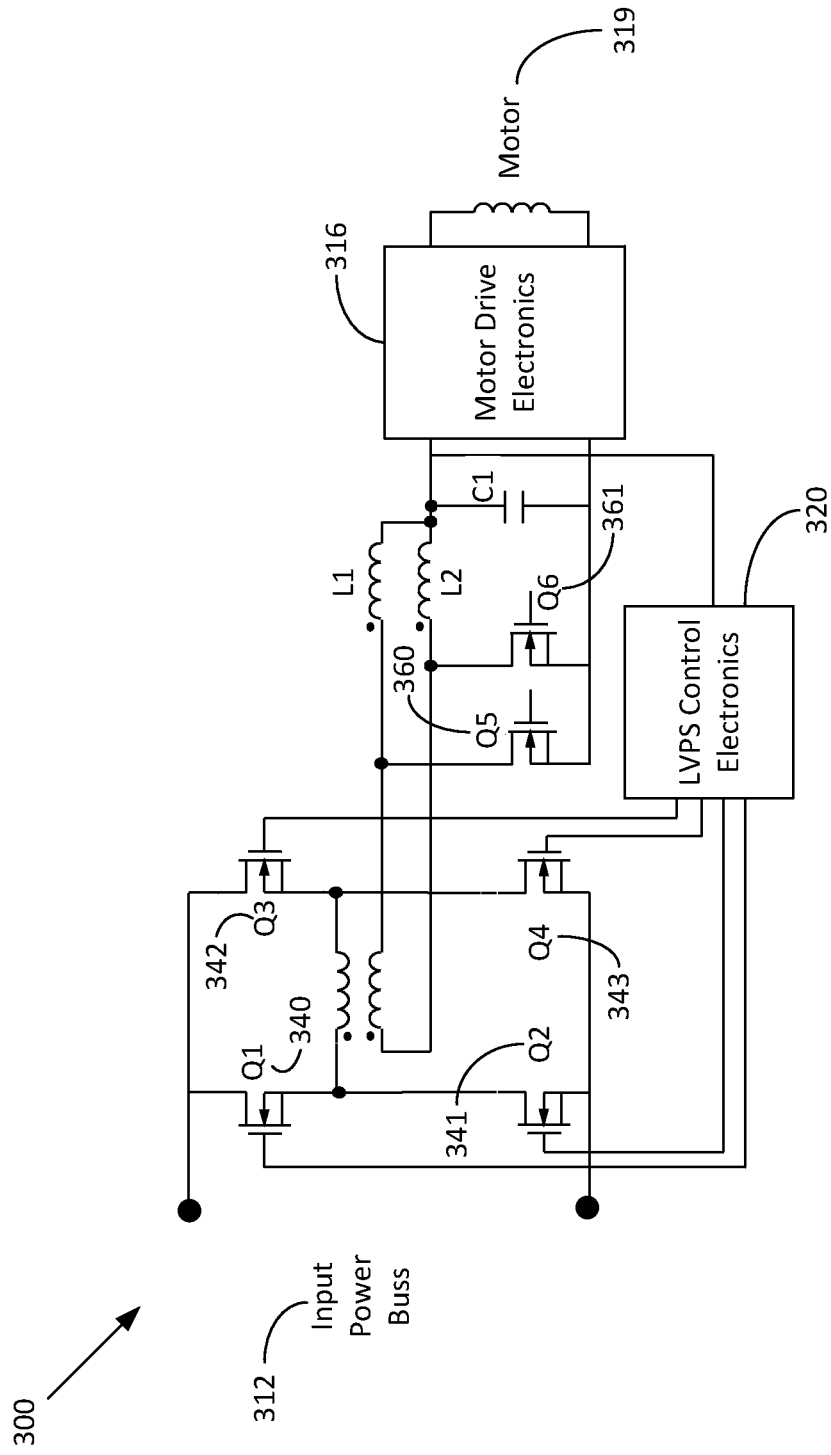
FIG. 3 illustrates an isolated multi-switch bidirectional power converter that uses synchronous rectification to provide low voltage power to the motor drive electronics or sink power from the motor drive electronics and return the power to the source.

FIG. 3 illustrates an isolated multi-switch bidirectional power converter 300 that uses synchronous rectification to provide isolated low voltage power to the motor drive electronics 316 or sink power from the motor driver electronics 316 and return the power to the source 312. In FIG. 3, while the input power buss 312 is sourcing power, the power converter 300 operates as a full bridge converter delivering power to the motor drive electronics 316. When the motor 319 is sourcing power, the direction of the output current of the power converter 300 reverses, and the power converter 300 begins operating as a current-fed converter transferring power to the input power buss 312. LVPS Control electronics 320 controls operation of the multi-switch bidirectional power converter 300. For example, the The operation of transistors Q1 340, Q2 341, Q3 342, Q4 343, Q5 360, Q6 361 are used to control the sourcing and sinking of power.

Accordingly, the multi-switch bidirectional power converter 300 provides a full-bridge converter using voltage doubler output rectification with synchronous rectifiers. However, the multi-switch bidirectional power converter 300 shown in FIG. 3 includes more parts than for two simple converters, e.g., 6 transistors versus 2 transistors for two simple converters (see FIG. 9 for example), and includes a correspondingly larger board area and volume. There are many other alternative types of power converter topologies that may be used for bidirectional power flow. In one example of an alternative, a bidirectional flyback converter uses three power MOSFETs, three power rectifiers, a four-winding transformer and a pulse width modulation (PWM) controller.

For high power systems, a multi-switch bidirectional power converter 300 using synchronous rectification may be used to source and sink power, and recycle the sinked power back to the input power buss 312 to reduce system power dissipation and to improve overall system efficiency. However, for low power systems, the volume, cost, and complexity of a multi-switch bidirectional power converter may not be warranted.

Figure 4:
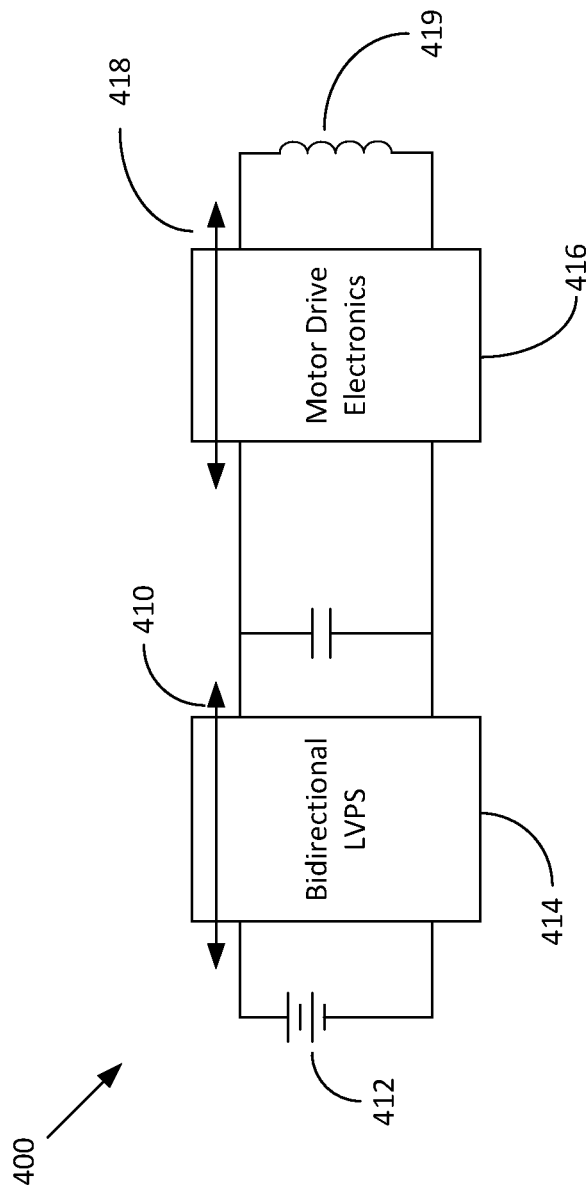
FIG. 4 is a block diagram of a bidirectional LVPS motor drive system according to an embodiment.

FIG. 4 is block diagram of a bidirectional motor drive system 400 according to an embodiment. In FIG. 4, bidirectional low voltage power supply (LVPS) 414 provides power to the motor drive electronics 416 and recycles power from the motor 419 back to the input power buss 412. The LVPS 414 may provide power to the motor drive electronics 416 that is isolated from the input power buss 412. Alternatively, the LVPS 414 may provide non-isolated power. In the bidirectional motor drive system 400, a load resistor may not be used to dissipate power sourced from the motor 419 for maintaining regulation. The current flow through the LVPS 414 is a bidirectional current flow 410. Likewise, the current flow through the motor drive electronics 416 is a bidirectional current flow 418.

Figure 5:
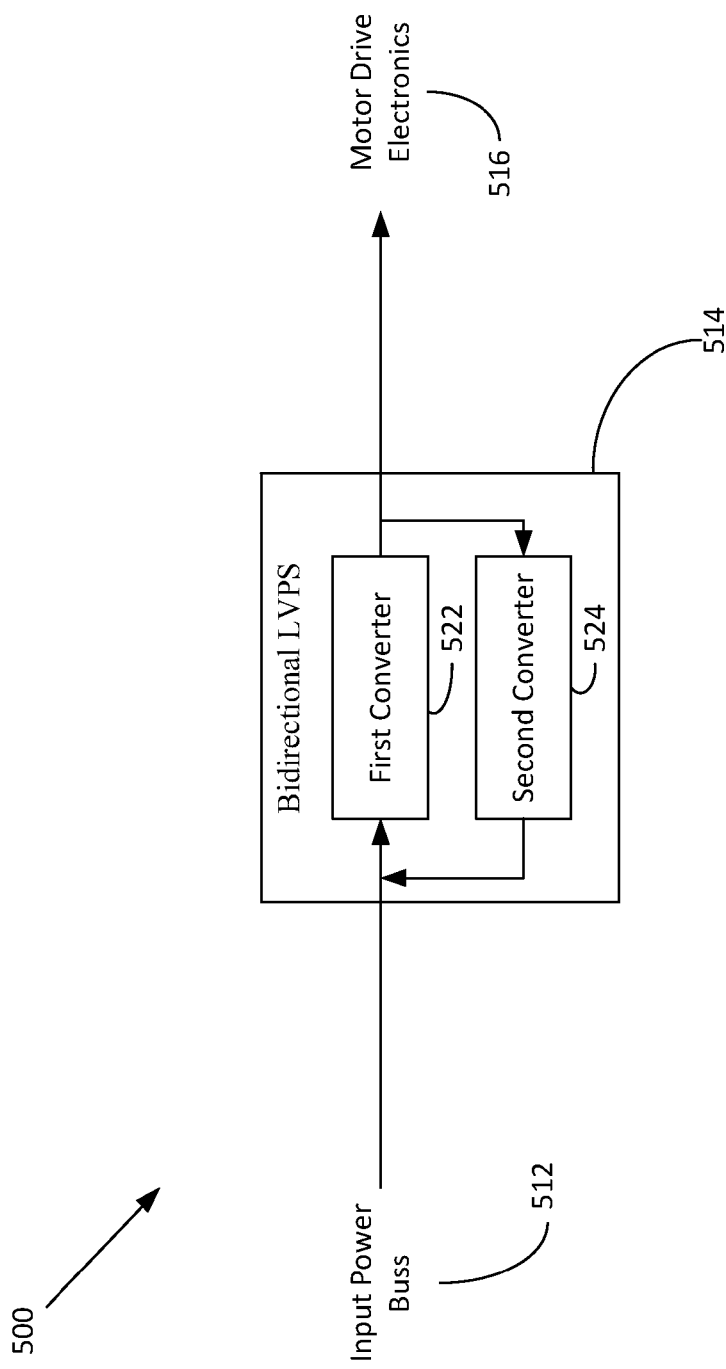
FIG. 5 is a block diagram of a bidirectional low voltage power supply (LVPS) according to an embodiment.

FIG. 5 is a block diagram of a system for providing bidirectional low voltage 500 according to an embodiment. In FIG. 5, the LVPS power converter 514 includes two simple, discrete and inexpensive converters 522, 524, set up to regulate the output voltage to the motor drive electronics 516. The LVPS 500 may provide power to the motor drive electronics 516 that is isolated from the input power buss 512. Alternatively, the LVPS 500 may provide non-isolated power. The second discrete converter 524 is coupled in parallel to the first discrete converter 522 in an opposite orientation. The first converter 522 delivers power from the input power buss 512 to the motor drive electronics 516 and regulates the voltage to the motor drive electronics 516 when the motor is driven as a load. The first power converter 522 thus provides power to the motor drive electronics 516, while the second power converter 524 is off. Subsequently, when the motor is functioning as a power source, the output voltage of the first converter increases, the first converter shuts off, and the second converter 524 sinks power from the motor drive electronics 516, and delivers power to the input power buss 512, regulating the voltage to the motor drive electronics 516. Thus, when power is being sourced by the motor, e.g., during a coolant expansion phase, the first power converter 522 turns off and the second power converter turns on to recycle power from the motor drive electronics back to the input power buss 512.

Figure 6:
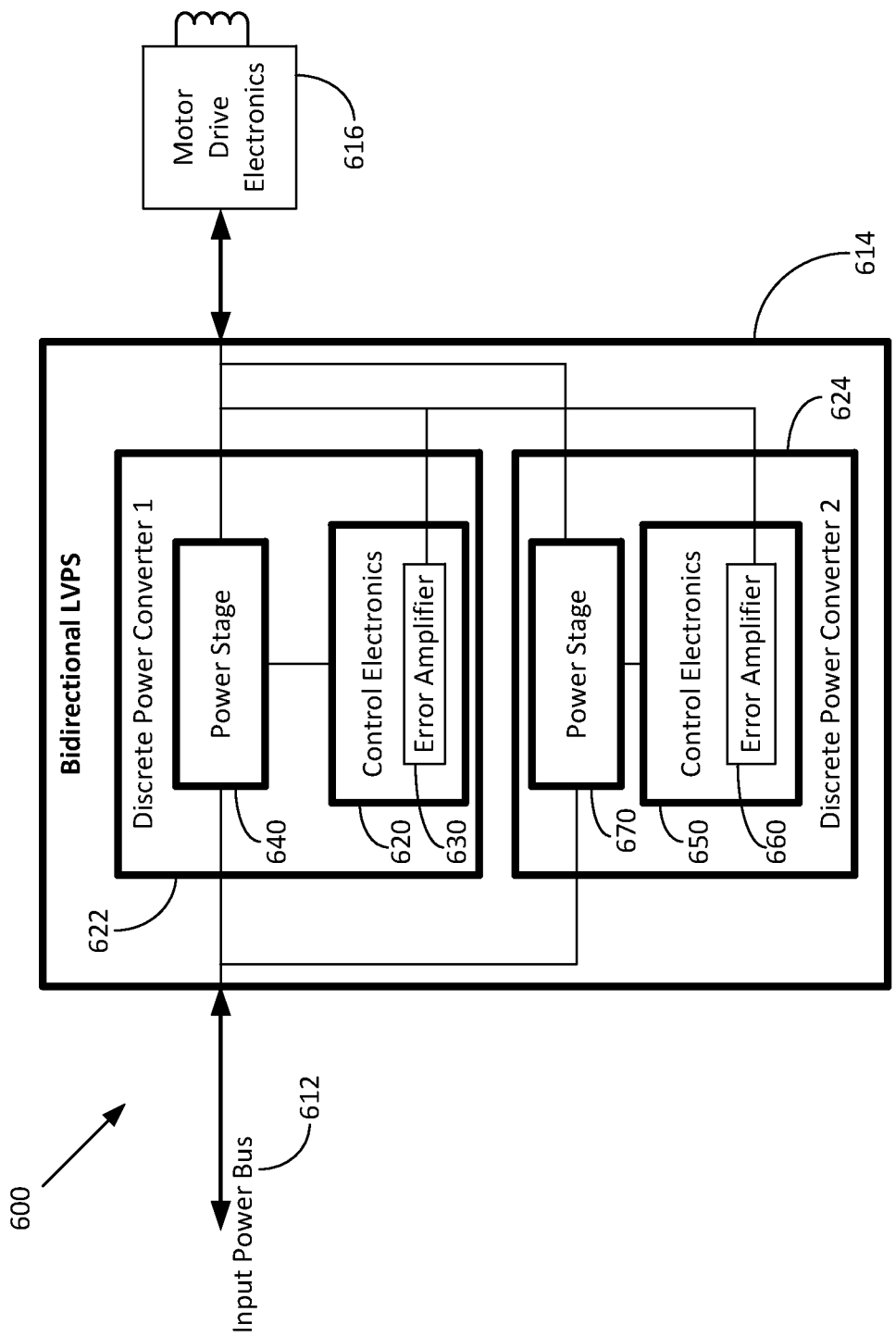
FIG. 6 is a block diagram of a bidirectional low voltage power supply (LVPS) that uses two converters, according to an embodiment.

FIG. 6 is a block diagram of a bidirectional motor drive system 600 that uses two converters, according to an embodiment. The LVPS 614 may provide power to the motor drive electronics 616 that is isolated from the input power buss 612. Alternatively, the LVPS 614 may provide non-isolated power. In FIG. 6, the bidirectional low voltage power supply (LVPS) 614 includes a first discrete power converter 622 and a second discrete power converter 624. The first discrete power converter 622 includes a first power stage 640 and first control electronics 620. The first control electronics 620 includes a first error amplifier 630. The second power converter 624 includes a second power stage 670 and second control electronics 650. The second control electronics 650 includes a second error amplifier 660. The error amplifier 660 is biased to regulate the voltage to the motor drive electronics to a slightly higher voltage than that to which the error amplifier 630 is biased to regulate.

The bidirectional LVPS converter 614 is coupled to the input power buss 612 to provide power to the motor drive electronics 616. When the motor is acting as a load, the first discrete converter 622 provides power, and regulates the voltage to the motor drive electronics 616 to a predetermined voltage. When the motor functions as a power source, and the motor drive electronics 616 return power to the output of the first converter 622, the voltage at the output of the first converter 622 increases, the error amplifier 630 shuts off the power stage 620, and the output power of the first discrete converter 622 is decreased to zero until such time as the output voltage drops. When the voltage at the output of the first converter 622 increases sufficiently, the error amplifier 660 turns on the power stage 670 to sink power from the motor drive electronics 616, and deliver power to the input power buss 612. This reduces the voltage to the motor drive electronics 616.

Conversely, if the voltage to the motor drive electronics 616 decreases excessively, the duty cycle and output power of the second discrete converter 624 is decreased to sink less power from the motor drive electronics 616, and deliver less power to the input power buss 612. This allows the voltage to the motor drive electronics 616 to increase. If the voltage to the motor drive electronics 616 decreases sufficiently, the duty cycle and output power of the second discrete converter 624 is decreased to zero, until such time as the output voltage rises.

Those skilled in the art will recognize that the two discrete converters 622, 624 may be an isolated flyback converter, an isolated forward converter, one of each, or any other topology, but that embodiments are not meant to be limited in that respect. The input power buss 612 may already be isolated from primary power, in which case the two discrete converters 622, 624 may be non-isolated converters. However, embodiments are not limited in that respect.

Due to component value initial tolerance, drift, or temperature coefficient, the voltage setpoint of the second discrete converter 624 may be less than the voltage set point of the first discrete converter 622, in which case, the two simple converters would be on at the same time, thereby cycling power in a loop. Such cycling of power would waste power and reduce efficiency. One method to prevent the discrete converters 622, 624 being on at the same time is to use a significantly higher voltage regulation set-point for the second discrete converter 624. Another method is to hold the second discrete converter 624 off while the first discrete converter 622 is operating.

Irrespective of whether the first discrete converter 622 uses voltage mode control or current mode control, the output voltage of the first error amplifier 630 of the first discrete converter 622 drops low to command a lower output voltage during the time when the motor is acting as a power source. Thus, the output voltage of the first error amplifier 630 of the first discrete converter 622 may be used to trigger the second discrete converter 624 to turn on.

There are several ways to use the output voltage of the first error amplifier 630 of the first discrete converter 622 to enable the second discrete converter 624, or conversely, to use the output voltage of the first error amplifier 630 of the first discrete converter 622 to keep the second discrete converter 624 disabled until the output voltage of the first error amplifier 630 of the first discrete converter 622 drops low.

There are also several ways to implement the bidirectional LVPS illustrated in the block diagrams. A few examples of embodiments of a bidirectional LVPS are given here. However, it is to be noted that these few examples are given to be illustrative, and not restrictive.

Figure 7:
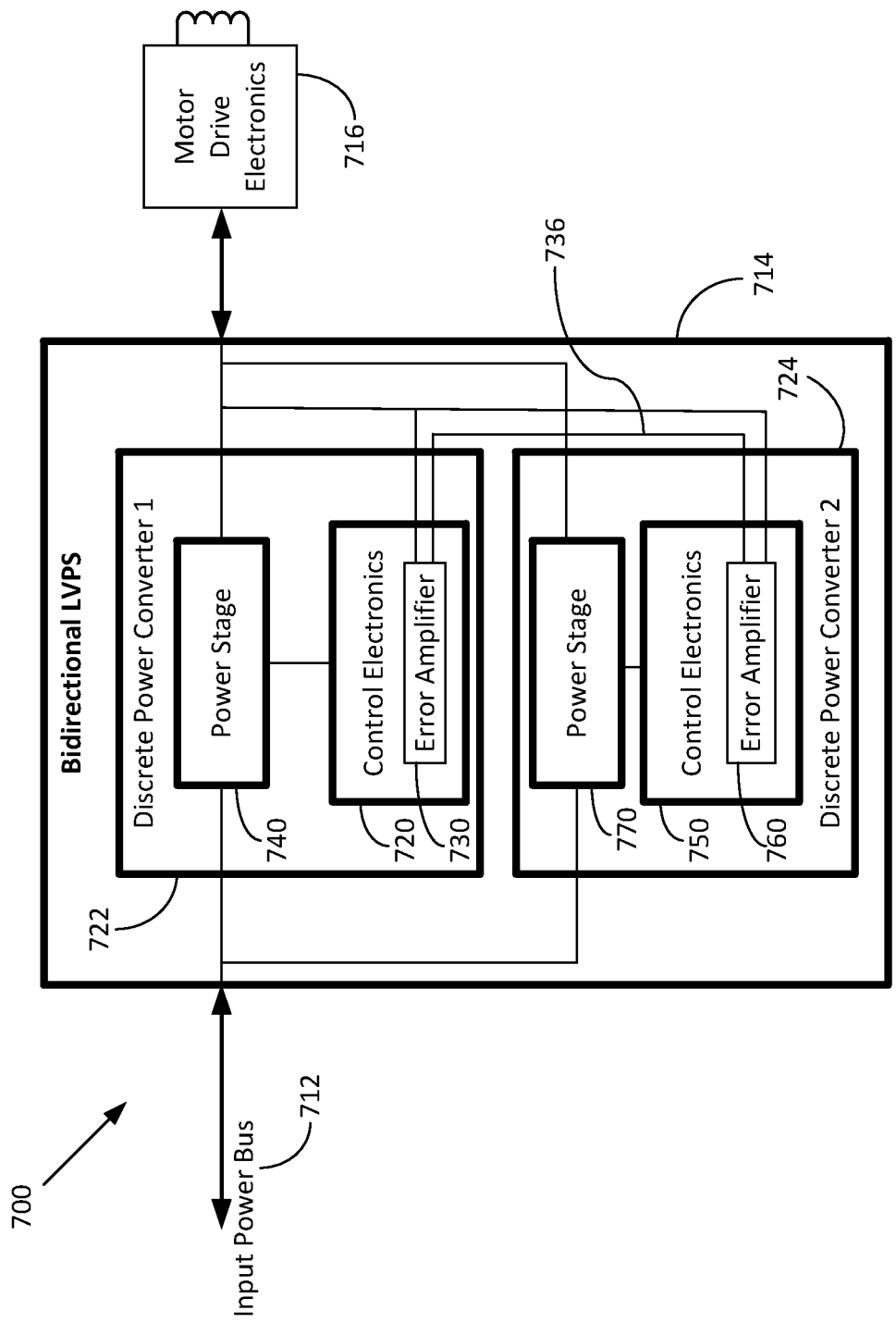
FIG. 7 is a block diagram of a bidirectional low voltage power supply (LVPS) that uses two converters, in which operation of the second converter is controlled by the error amplifier of the first converter, according to an embodiment.

FIG. 7 is a block diagram of a bidirectional motor drive system 700 that uses a bidirectional low voltage power supply (LVPS) 714 that uses two converters according to another embodiment. The LVPS 714 may provide power to the motor drive electronics 716 that is isolated from the input power buss 712. Alternatively, the LVPS 714 may provide non-isolated power. In FIG. 7, the bidirectional low voltage power supply (LVPS) 714 includes a first discrete power converter 722 and a second discrete power converter 724. The first discrete power converter 722 includes a first power stage 740 and first control electronics 720. The first control electronics 720 includes a first error amplifier 730. The second power converter 724 includes a second power stage 770 and second control electronics 750. The second control electronics 750 includes a second error amplifier 760. In FIG. 7, the second converter 724 is controlled by the error amplifier 730 of the first converter 722 by means of a signal 736. The signal 736 may be the direct output of the error amplifier 730, or may be a signal generated from the output of the error amplifier 730

The bidirectional LVPS converter 714 is coupled to the input power buss 712 to provide power to the motor drive electronics 716. When the motor is acting as a load, the first discrete converter 722 provides power, and regulates the voltage to the motor drive electronics 716 to a predetermined voltage at the output of the first discrete converter 722. The error amplifier 730 holds off the second discrete converter 724 by means of signal 736. When the motor functions as a power source, and the motor drive electronics return power to the output of the first converter 722, the voltage at the output of the first converter 722 increases, the error amplifier 730 shuts off the power stage 720, and the output power of the first discrete converter 722 is decreased to zero until such time as the output voltage drops. The error amplifier 730 dropping low enables the second converter 724 by means of signal 736. When the voltage at the output of the first converter 722 increases sufficiently, the error amplifier 760 turns on the power stage 770 of the second discrete converter 724 to sink power from the motor drive electronics 716, and deliver power to the input power buss 712. This reduces the voltage to the motor drive electronics 716.

If the voltage to the motor drive electronics 716 increases, the duty cycle (and output power) of the second discrete converter 724 is increased to sink additional power from the motor drive electronics 716, and deliver additional power to the input power buss 712. This reduces the voltage to the motor drive electronics 716.

Conversely, if the voltage to the motor drive electronics 716 decreases, the duty cycle and output power of the second discrete converter 724 is decreased to sink less power from the motor drive electronics 716, and deliver less power to the input power buss 712, thus regulating the voltage to the motor drive electronics 716.

When the motor again acts as a load, and the motor drive electronics draw power from the output of the first converter 722, the voltage at the output of the first converter 722 decreases. The error amplifier 730 senses the lower voltage, and increases its output voltage, enabling the power stage 720, and the first discrete converter 722 provides power, and regulates the voltage to the motor drive electronics 716 to the predetermined voltage. The error amplifier 730 also holds off the second discrete converter 724 by means of signal 736. Thus, in the bidirectional LVPS 714 of FIG. 7, the error amplifier 730 of the first discrete power converter 722 is used to control the second discrete power converter 724.

Figure 8:
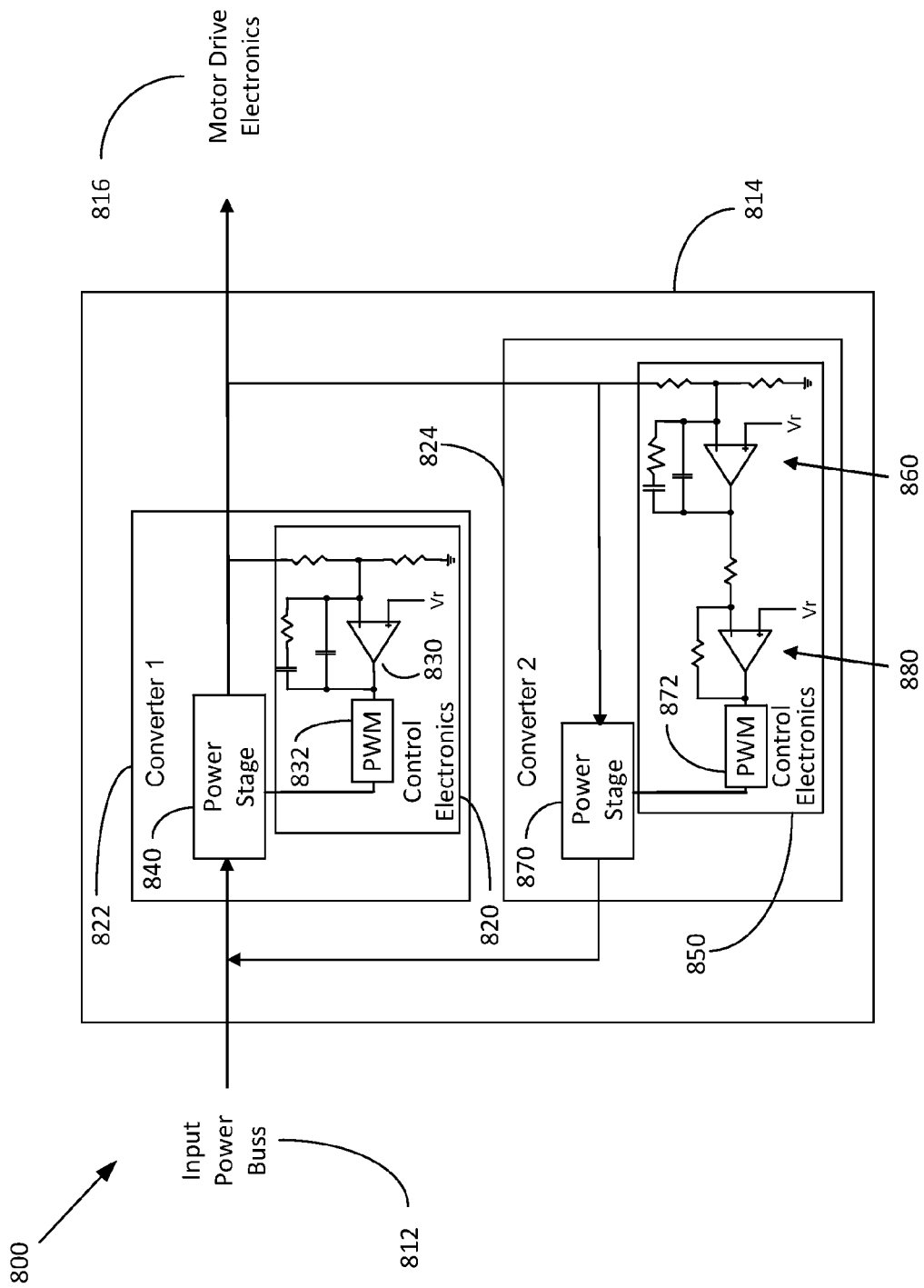
FIG. 8 is a detailed block diagram of a bidirectional low voltage power supply (LVPS) that uses two converters, according to an embodiment.

FIG. 8 is a simplified schematic diagram of a bidirectional low voltage power supply (LVPS) 800 that uses two converters, according to an embodiment. The LVPS 814 may provide power to the motor drive electronics 816 that is isolated from the input power buss 812. Alternatively, the LVPS 800 may provide non-isolated power. The bidirectional LVPS 800 includes a first discrete power converter 822 and a second discrete power converter 824. The first discrete power converter 822 includes a first power stage 840 and first control electronics 820. The first control electronics 820 includes a first error amplifier 830 and a first pulse width modulation device 832. The first PWM device 832 is used to convert the output voltage of the error amplifier 830 to duty cycle of the switch transistors in the power stage 840, and by doing so, enables the error amplifier 830 to control the output power of the converter power stage 840. The second power converter 824 includes a second power stage 870 and second control electronics 850. The second control electronics 850 includes a second error amplifier 860, a second pulse width modulation device 872, and an inverting amplifier 880. The PWM device 872 is used to convert the output voltage of the inverting amplifier 860 to duty cycle of the switch transistors in the power stage 870, and by doing so, enables the error amplifier 860 to control the output power of the converter power stage 870. The bidirectional LVPS 800 is coupled to the input power buss 812 to provide power to the motor drive electronics 816.

In FIG. 8, the second discrete converter 824 regulates using an added inverting amplifier 880 placed after the error amplifier 860. The second discrete converter 824 regulates the voltage to the motor drive electronics 816 to a voltage slightly greater than the designed output voltage of the first discrete converter 822.

The inverting amplifier 880 after the error amplifier 860 increases the duty cycle and output power of the second discrete converter 824 when the voltage to the motor drive electronics 816 increases, to sink additional power from the motor drive electronics 816, and deliver additional power to the input power buss 812, which reduces the voltage to the motor drive electronics 816. Conversely, if the voltage to the motor drive electronics 816 decreases, the duty cycle and output power of the second discrete converter 824 is decreased to sink less power from the motor drive electronics 816, and deliver less power to the input power buss 812, which allows the voltage to the motor drive electronics 816 to increase.

Figure 9:
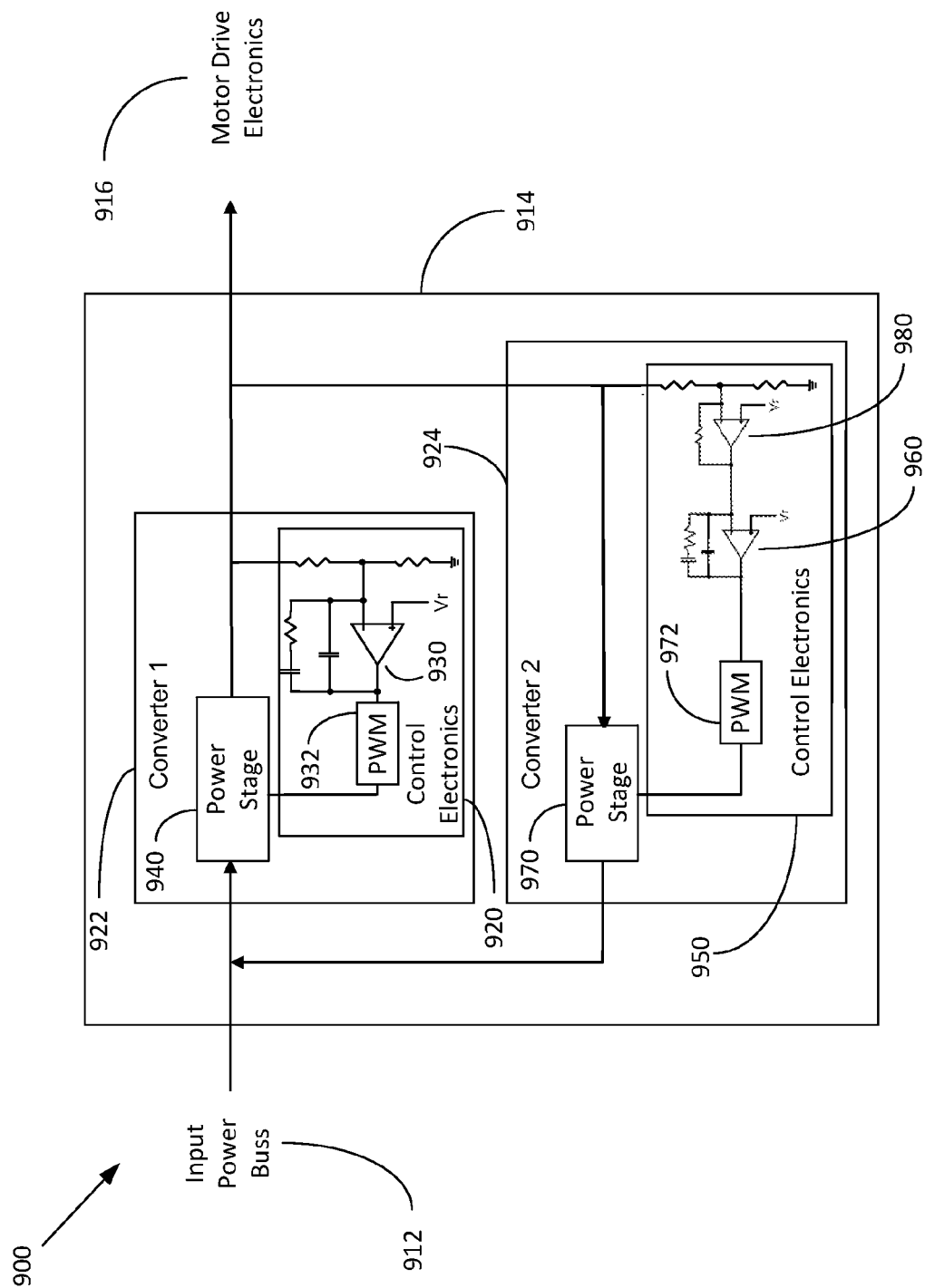
FIG. 9 is a detailed block diagram of another implementation (in which the inverter precedes the error amplifier) of a bidirectional low voltage power supply (LVPS) that uses two converters, according to an embodiment.

FIG. 9 is a simplified schematic diagram of a system for providing bidirectional low voltage 900 using two converters according to another embodiment. A bidirectional LVPS 914 may provide power to the motor drive electronics 916 that is isolated from the input power buss 912. Alternatively, the LVPS 900 may provide non-isolated power. The bidirectional LVPS 900 includes a first discrete power converter 922 and a second discrete power converter 924. The first discrete power converter 922 is coupled to input power buss 912 and includes a first power stage 940 and first control electronics 920. The first control electronics 920 includes a first error amplifier 930 and a pulse width modulation device 932. The PWM device 932 is used to convert the output voltage of the error amplifier 930 to duty cycle of the switch transistors in the power stage 940, and by doing so, enables the error amplifier 930 to control the output power of the converter power stage 940. The second power converter 924 includes a second power stage 970 and second control electronics 950. The second control electronics 950 includes a second error amplifier 960, a pulse width modulation device 972, and an inverting amplifier 980. The PWM device 972 is used to convert the output voltage of the error amplifier 960 to duty cycle of the switch transistors in the power stage 970, and by doing so, enables the error amplifier 960 to control the output power of the converter power stage 970. The inverting amplifier 980 before the error amplifier 960 increases the duty cycle and output power of the second discrete converter 924 when the voltage to the motor drive electronics 916 increases, to sink additional power from the motor drive electronics 916, and deliver additional power to the input power buss 912, which reduces the voltage to the motor drive electronics 916. Conversely, if the voltage to the motor drive electronics 916 decreases, the duty cycle and output power of the second discrete converter 924 is decreased to sink less power from the motor drive electronics 916, and deliver less power to the input power buss 912, which allows the voltage to the motor drive electronics 916 to increase. The bidirectional LVPS 900 is coupled to the input power buss 912 to provide power to the motor drive electronics 916.

Figure 10:
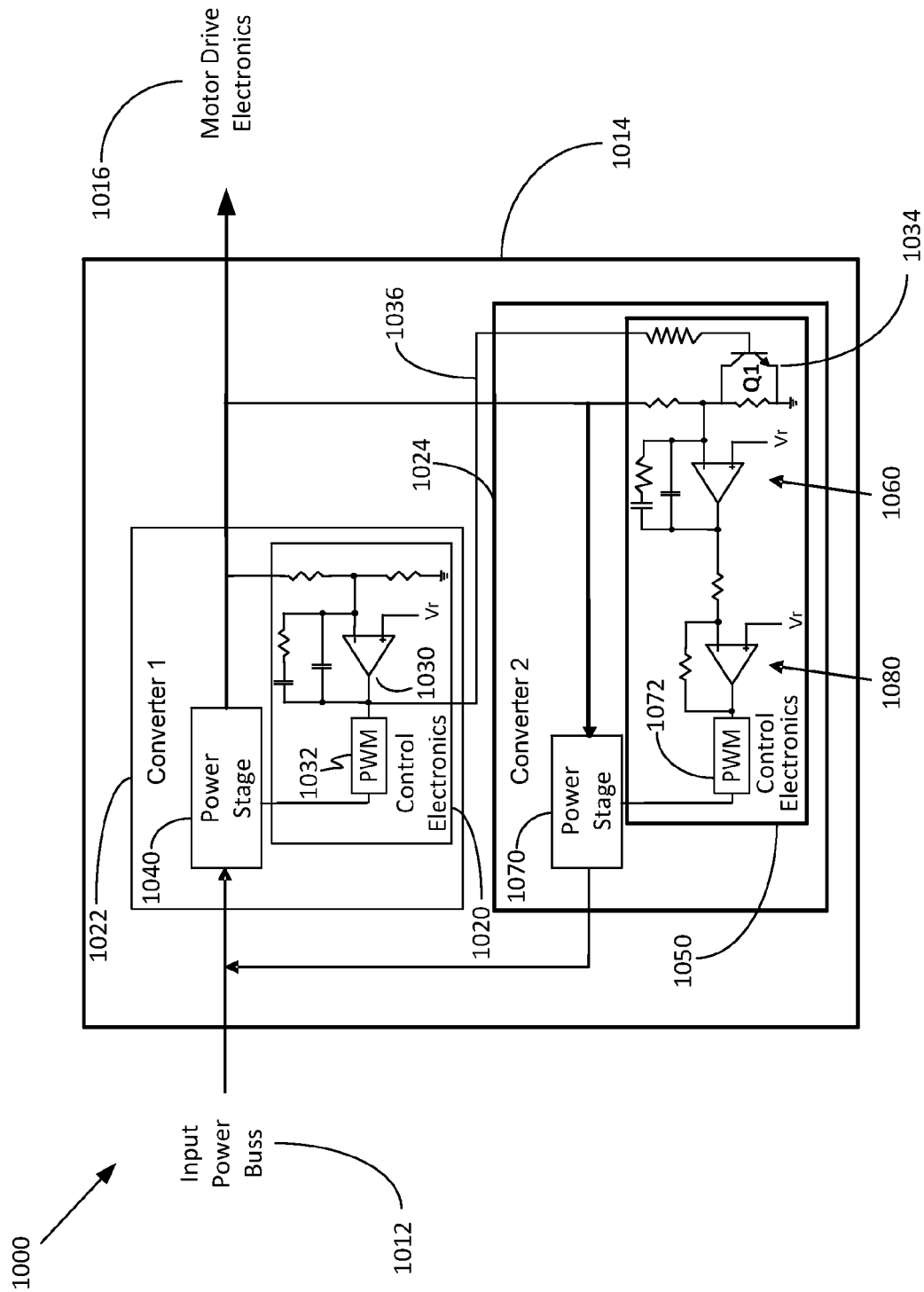
FIG. 10 is a detailed block diagram of one implementation of a bidirectional low voltage power supply (LVPS) that uses two converters, in which operation of the second converter is controlled by the error amplifier of the first converter, according to an embodiment.

FIG. 10 is a simplified schematic diagram of a system for providing bidirectional low voltage 1000 using two converters according to another embodiment. A bidirectional LVPS converter 1014 is coupled to the input power buss 1012 to provide power to the motor drive electronics 1016. The LVPS 1000 may provide power to the motor drive electronics 1016 that is isolated from the input power buss 1012. Alternatively, the LVPS 1000 may provide non-isolated power. The bidirectional LVPS 1000 includes a first discrete power converter 1022 and a second discrete power converter 1024. The first discrete power converter 1022 includes a first power stage 1040 and first control electronics 1020. The first control electronics 1020 includes a first error amplifier 1030 and a pulse width modulation device 1032. The PWM device 1032 is used to convert the output voltage of the inverting amplifier 1080 to duty cycle of the switch transistors in the power stage 1040, and by doing so, enables the error amplifier 1030 to control the output power of the converter power stage 1040. The second power converter 1024 includes a second power stage 1070 and second control electronics 1050. The second control electronics 1050 includes a second error amplifier 1060, a pulse width modulation device 1072, an inverting amplifier 1080, and a controlled switching device 1034. The PWM device 1072 is used to convert the output voltage of the inverting amplifier 1060 to duty cycle of the switch transistors in the power stage 1070, and by doing so, enables the error amplifier 1060 to control the output power of the converter power stage 1070. The inverting amplifier 1080 after the error amplifier 1060 increases the duty cycle and output power of the second discrete converter 1024 when the voltage to the motor drive electronics 1016 increases, to sink additional power from the motor drive electronics 1016, and deliver additional power to the input power buss 1012, which reduces the voltage to the motor drive electronics 1016. The bidirectional LVPS 1000 shown in FIG. 10 controls the operation of the second converter 1024 using a signal 1036 from the output of the error amplifier 1030 of the first converter 1022. The signal 1036 may be the direct output of the error amplifier 1030, or may be a signal generated from the output of the error amplifier 1030. The controlled switching device 1034 is shown as an bipolar transistor Q1, but any of many controlled switching devices (such as a MOSFET, comparator, optical coupler, operational amplifier, etc.) may be used.

In FIG. 10, transistor Q1, 1034, is added to the second control electronics 1050 to control the on/off state of the second discrete converter 1024 using a signal 1036 from the first error amplifier 1030 so that the second discrete converter 1024 is maintained in an off state until the output voltage of the first error amplifier 1030 of the first discrete converter 1022 goes low. When the motor is acting as a load, drawing power from the motor drive electronics 1016, the first discrete converter 1022 provides power to the motor drive electronics 1016, and the motor drive electronics 1016 drive the motor. The first error amplifier 1030 of the first discrete converter 1022 is at a high voltage level, the actual voltage level depends on the PWM used, the converter design, input buss voltage, and the power drawn by the motor drive electronics. Transistor Q1 1034 is turned on and holds the input to the second error amplifier 1060 low, which keeps the second discrete converter 1024 off.

When the motor is acting as a power source, sourcing power to the motor drive electronics 1016, the output voltage of the first discrete converter 1022 rises; the output voltage of the first error amplifier 1030 goes low, shuts off the transfer of power from the first discrete converter 1022 to the motor drive electronics 1016, and shuts off transistor Q1, 1034. With transistor Q1 1034 off, the feedback voltage to the second error amplifier 1060 goes high, the second error amplifier 1060 senses the high voltage, and the output voltage of the second error amplifier 1060 drops low. The output of the inverting amplifier 1080 goes high, and commands power to be recycled back to the input power buss 1012. The second discrete converter 1024 regulates the voltage to the motor drive electronics 1016 by transferring power back to the input power buss 1012. The second discrete converter 1024 may be capable of transferring more power than the motor is capable of sourcing, to maintain regulation of the voltage to the motor drive electronics 1016.

For example, the first discrete converter 1022 may be set to regulate an output voltage of +15.0 V, and the second discrete converter 1024 may be set to regulate an output voltage of +15.5 V. When the motor acts as a load, the first discrete converter 1022 provides power to the motor drive electronics 1016, and regulates the output voltage to +15.0 V. Since the output voltage of the first error amplifier 1030 is high, commanding output power, transistor Q1 1034 is on, and the output voltage feedback to the second error amplifier 1060 is low, the output of the second error amplifier 1060 is high, and the output of the inverting amplifier 1080 goes low, shutting off the second discrete power stage 1070. When the motor sources power, the output voltage of the first discrete converter 1022 rises to greater than 15.0 V, the output of the first error amplifier 1030 drops low, shuts off the transfer of power to the output through the first discrete converter 1022, and shuts off transistor Q1 1034. The feedback signal of second error amplifier 1060 goes high. When the voltage to the motor drive electronics 1016 reaches 15.5 V, the second error amplifier 1060 goes low, the output of the inverting amplifier 1080 goes high to turn on the second discrete power stage 1070, which recycles power back to the input power buss 1012. The second discrete converter 1024 regulates the voltage to the motor drive electronics 1016 to +15.5 V by transferring power back to the input power buss 1012.

The addition of transistor Q1 1034 is one example of how to control the second discrete converter 1024 operation by the output voltage of the first error amplifier 1030. Alternatively, a comparator or other circuitry may be used to control the operation of the second discrete converter 1024 using the signal 1036 generated from the output voltage of the first error amplifier 1030 of the first discrete converter 1022. In addition, other means may be used to control the operation of the second discrete converter 1024 using a signal 1036 generated from the output voltage of the first error amplifier 1030 of the first discrete converter 1022. For example, some PWMs provide a shutdown pin to disable the PWM, shutting of the converter. On other PWMs, the error amplifier output may be pulled to ground to disable the PWM. However, those skilled in the art will recognize that embodiments are not meant to be limited in this respect. The converters may use fast recovery diodes, ultrafast recovery diodes, Schottky diodes, high voltage Schottky diodes, Silicon carbide (SiC) rectifiers, or synchronous rectification. Further, the converters may be hard-switched converters, soft-switched converters, or quasi-resonant converters. A converter may be or use a ripple regulator. Again, those skilled in the art will recognize that embodiments are not meant to be limited in this respect.

Figure 11:
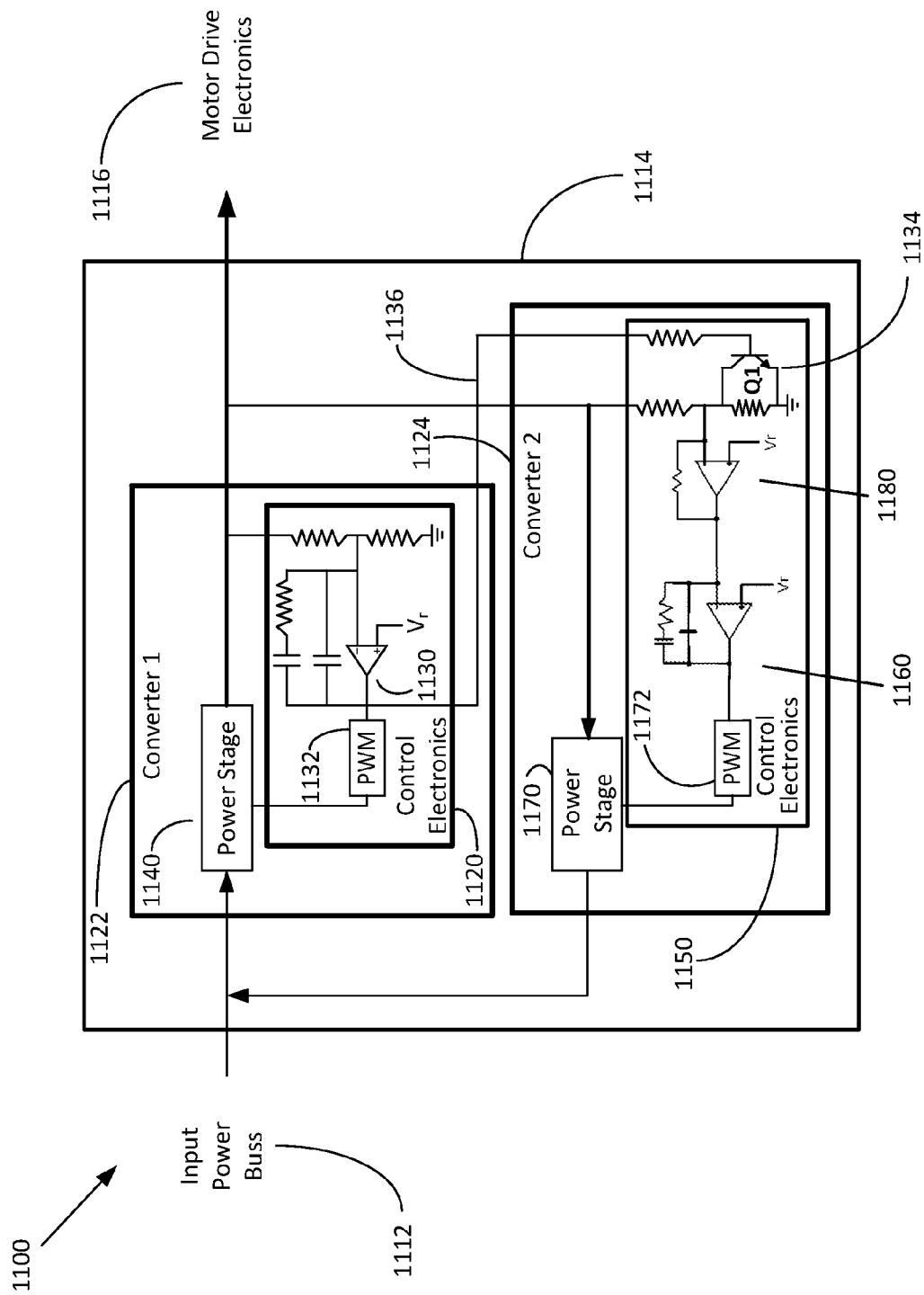
FIG. 11 is a detailed block diagram of another implementation of a bidirectional low voltage power supply (LVPS) that uses two converters, in which operation of the second converter is controlled by the error amplifier of the first converter, according to an embodiment.

FIG. 11 is a simplified schematic diagram of a system for providing bidirectional low voltage 1100 using two converters according to another embodiment. A bidirectional LVPS converter 1114 is coupled to the input power buss 1112 to provide power to the motor drive electronics 1116. The LVPS 1100 may provide power to the motor drive electronics 1116 that is isolated from the input power buss 1112. Alternatively, the LVPS 1100 may provide non-isolated power. The bidirectional LVPS 1100 includes a first discrete power converter 1122 and a second discrete power converter 1124. The first discrete power converter 1122 includes a first power stage 1140 and first control electronics 1120. The first control electronics 1120 includes a first error amplifier 1130 and a pulse width modulation device 1132. The PWM device 1132 is used to convert the output voltage of the error amplifier 1130 to duty cycle of the switch transistors in the power stage 1140, and by doing so, enables the error amplifier 1130 to control the output power of the converter power stage 1140. The second power converter 1124 includes a second power stage 1170 and second control electronics 1150. The second control electronics 1150 includes a second error amplifier 1160, a pulse width modulation device 1172, an inverting amplifier 1180, and a controlled switching device Q1 1134. The PWM device 1172 is used to convert the output voltage of the error amplifier 1160 to duty cycle of the switch transistors in the power stage 1170, and by doing so, enables the error amplifier 1160 to control the output power of the converter power stage 1170. The inverting amplifier 1180 before the error amplifier 1160 increases the duty cycle and output power of the second discrete converter 1124 when the voltage to the motor drive electronics 1116 increases, to sink additional power from the motor drive electronics 1116, and deliver additional power to the input power buss 1112, which reduces the voltage to the motor drive electronics 1116. The bidirectional LVPS 1100 in FIG. 11 controls the operation of the second converter 1124 using the signal 1136 from the output of the error amplifier 1130 of the first converter 1122. The signal 1136 may be the direct output of the error amplifier 1130, or may be a signal generated from the output of the error amplifier 1130. The controlled switching device 1134 is shown as an NPN bipolar transistor Q1, but any of many controlled switching devices (such as a MOSFET, comparator, optical coupler, operational amplifier, etc.) may be used. In addition, other means may be used to control the operation of the second discrete converter 1124 using a signal 1136 generated from the output voltage of the first error amplifier 1130 of the first discrete converter 1122.

In FIG. 11, the second control electronics 1150 includes a transistor Q1 1134 to control the on/off state of the second discrete converter 1124 using a signal 1136 from the first error amplifier 1130 so that the second discrete converter 1124 is maintained in an off state until the output voltage of the first error amplifier 1130 of the first discrete converter 1122 goes low. When the motor is acting as a load, drawing power from the motor drive electronics 1116, the first discrete converter 1122 provides power to the motor drive electronics 1116, and the motor drive electronics 1116 drive the motor. The first error amplifier 1130 of the first discrete converter 1122 is at a high voltage level, the actual voltage level depends on the PWM used and the converter design. Transistor Q1 1134 is turned on and holds the input to the inverting amplifier 1160 low, which keeps the second discrete converter 1124 off.

Figure 12:
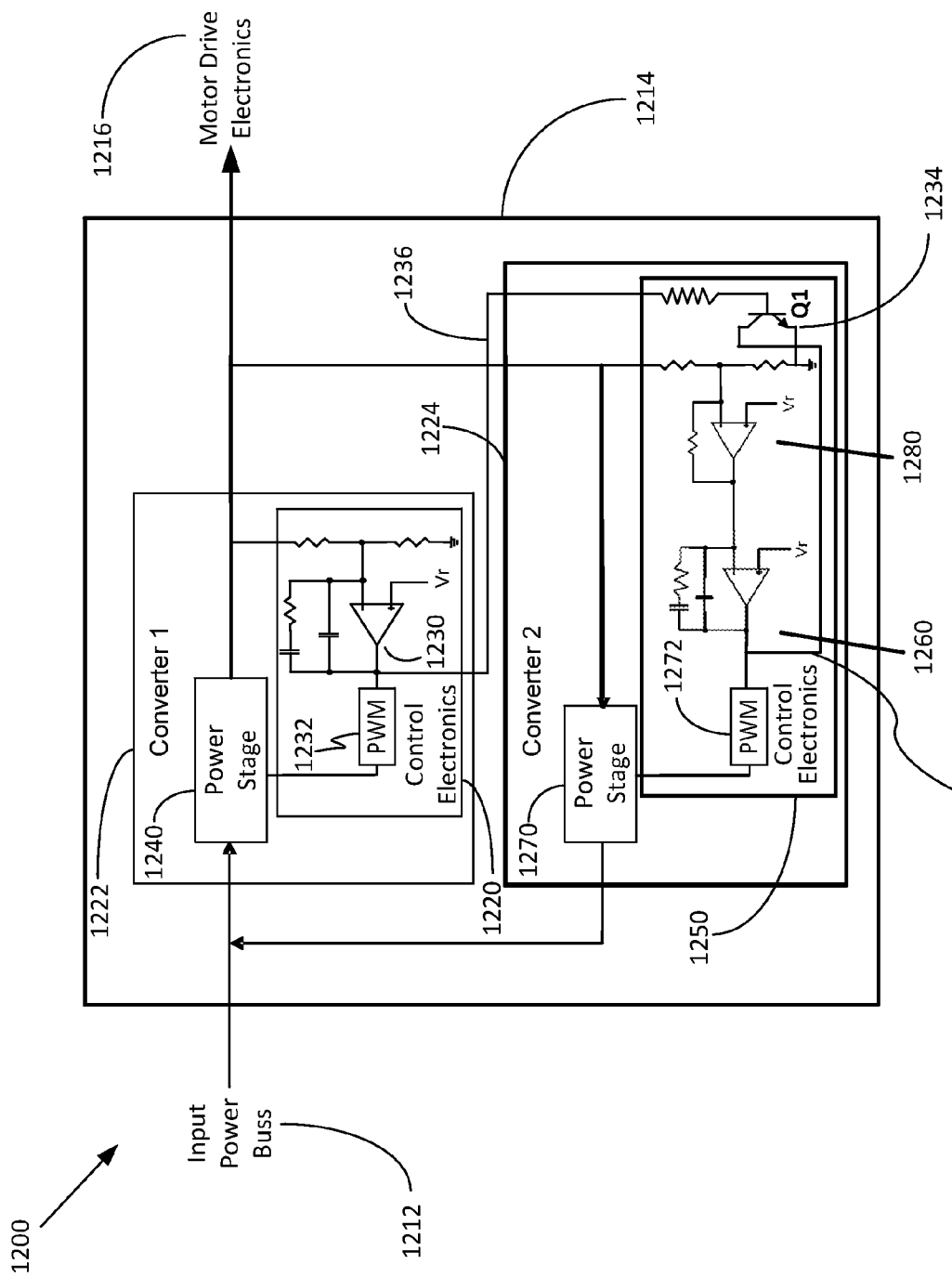
FIG. 12 is a detailed block diagram of another implementation of a bidirectional low voltage power supply (LVPS) that uses two converters, in which operation of the second converter is controlled by the error amplifier of the first converter, according to an embodiment.

FIG. 12 is a simplified schematic diagram of a system for providing bidirectional low voltage 1200 using two converters according to another embodiment, and illustrates another means to shut off the second converter 1124. The bidirectional LVPS converter 1214 is coupled to the input power buss 1212 to provide power to the motor drive electronics 1216. The LVPS 1200 may provide power to the motor drive electronics 1216 that is isolated from the input power buss 1212. Alternatively, the LVPS 1200 may provide non-isolated power. The bidirectional LVPS 1200 includes a first discrete power converter 1222 and a second discrete power converter 1224. The first discrete power converter 1222 includes a first power stage 1240 and first control electronics 1220. The first control electronics 1220 includes a first error amplifier 1230 and a pulse width modulation device 1232. The PWM device 1232 is used to convert the output voltage of the error amplifier 1230 to duty cycle of the switch transistors in the power stage 1240, and by doing so, enables the error amplifier 1230 to control the output power of the converter power stage 1240. The second power converter 1224 includes a second power stage 1270 and second control electronics 1250. The second control electronics 1250 includes a second error amplifier 1260, an inverting amplifier 1280, a pulse width modulation device 1272, and a controlled switching device Q1 1234. The PWM device 1272 is used to convert the output voltage of the error amplifier 1260 to duty cycle of the switch transistors in the power stage 1270, and by doing so, enables the error amplifier 1260 to control the output power of the converter power stage 1270. The inverting amplifier 1280 before the error amplifier 1260 increases the duty cycle and output power of the second discrete converter 1224 when the voltage to the motor drive electronics 1216 increases, to sink additional power from the motor drive electronics 1216, and deliver additional power to the input power buss 1212, which reduces the voltage to the motor drive electronics 1216. However, in FIG. 12, the transistor Q1 1234 used to control the on/off state of the second discrete converter 1224 using a signal 1236 from the first error amplifier 1230, or a signal generated from the output of the error amplifier 1230, is coupled to the output of the error amplifier 1260 via signal 1237 through PWM 1272 to disable the second converter 1224.

Figure 13:
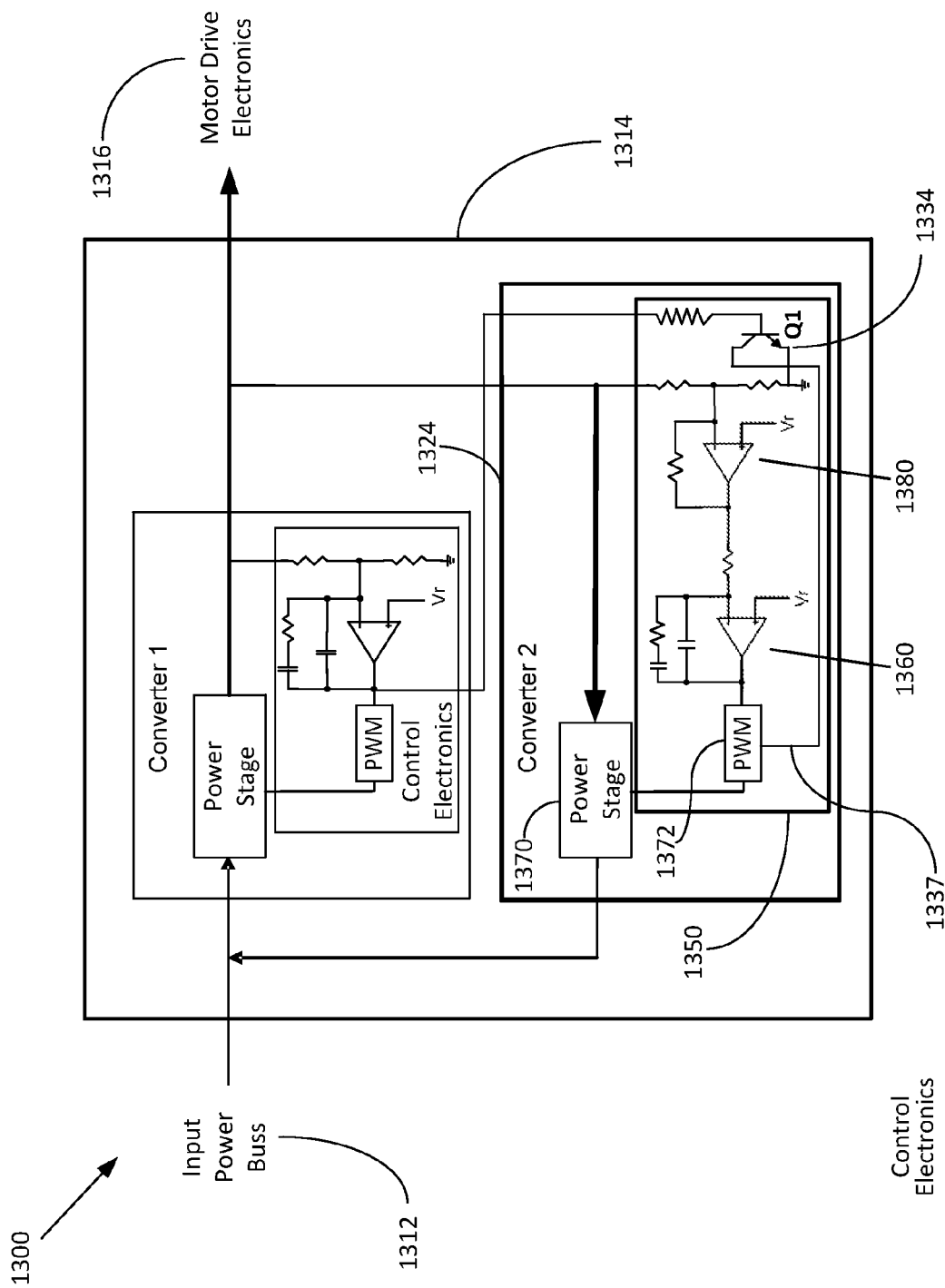
FIG. 13 is a simplified schematic diagram of an implementation of a bidirectional low voltage power supply (LVPS) that uses two converters, in which operation of the second converter is controlled by the error amplifier of the first converter, according to an embodiment.

FIG. 13 is a simplified schematic diagram of a system for providing bidirectional low voltage 1300 using two converters according to another embodiment. The bidirectional LVPS converter 1314 is coupled to the input power buss 1312 to provide power to the motor drive electronics 1316. The second power converter 1324 includes a second power stage 1370 and second control electronics 1350. Thus, the bidirectional LVPS 1314 is similar to the bidirectional LVPS 1200 shown in FIG. 12, except the controlled switching device 1334 of the bidirectional LVPS 1314 provides a pulls down 1337 at an input to the PWM 1372 to disable the second converter 1324. The inverting amplifier 1380 before the error amplifier 1360 control the duty cycle and output power of the second discrete converter 1324.

Figure 14:
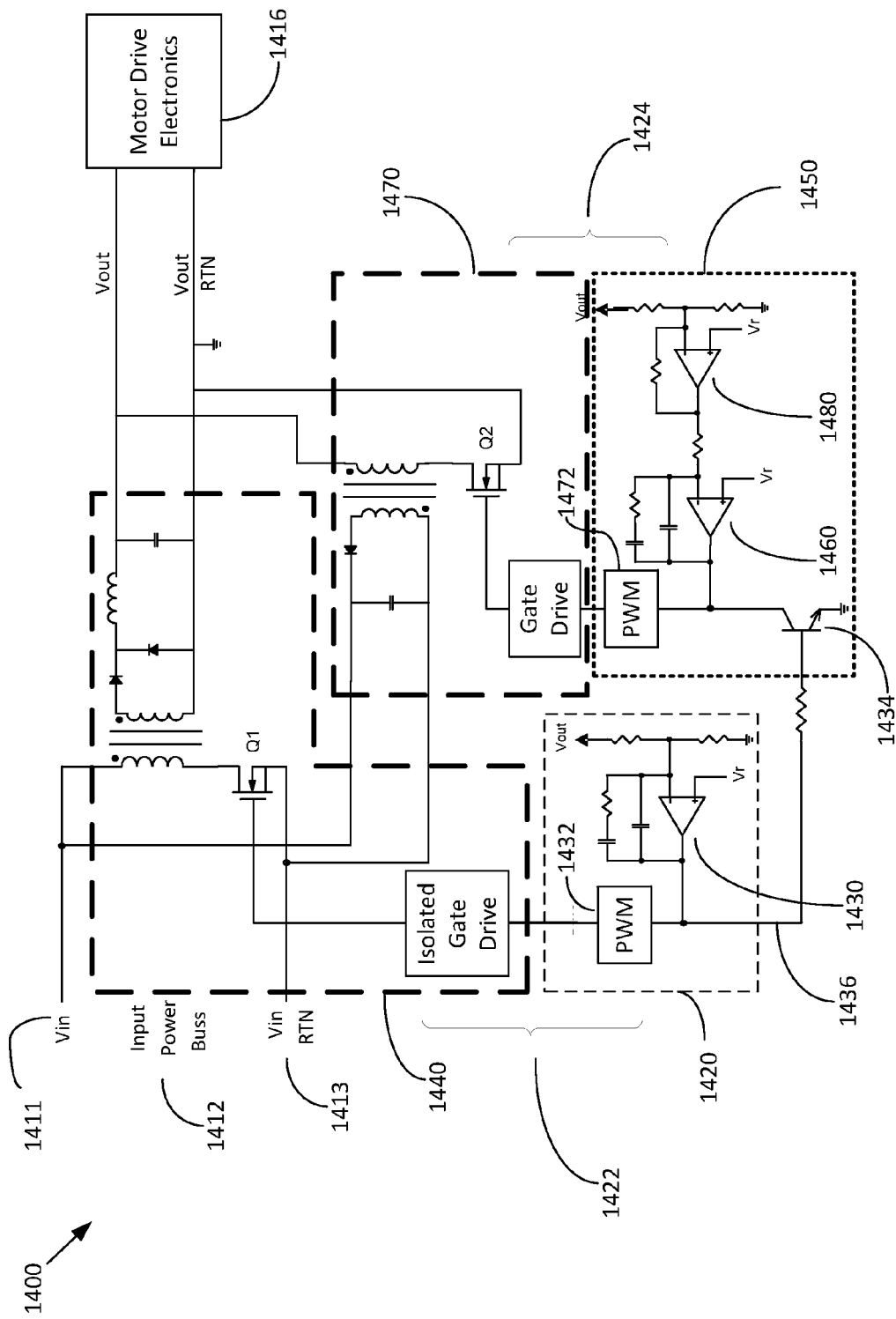
FIG. 14 is a simplified schematic diagram of a bidirectional LVPS according to an embodiment.

FIG. 14 is a simplified schematic diagram of a system for providing bidirectional low voltage 1400 according to an embodiment. The bidirectional LVPS converter 1414 is coupled to the input power buss 1412 at $V_{in}$ 1411 and $V_{in}$ RTN (return) 1413 to provide power to the motor drive electronics 1416. The LVPS 1400 provides power to the motor drive electronics that is isolated from the input power buss. Alternatively, the LVPS 1400 may be configured to provide non-isolated power. The bidirectional LVPS 1400 includes a first discrete power converter 1422 and a second discrete power converter 1424. The first discrete power converter 1422 includes a first power stage 1440 and first control electronics 1420. The first control electronics 1420 includes a first error amplifier 1430 and a pulse width modulation device 1432. The PWM device 1432 is used to convert the output voltage of the inverting amplifier 1430 to duty cycle of the switch transistors in the power stage 1440, and by doing so, enables the error amplifier 1430 to control the output power of the power stage 1440. The power stage 1440 is configured as a forward converter. The second power converter 1424 includes a second power stage 1470 and second control electronics 1450. The second control electronics 1450 includes a second error amplifier 1460, a pulse width modulation device 1472, and an inverting amplifier 1480. The PWM device 1472 is used to convert the output voltage of the inverting amplifier 1460 to duty cycle of the switch transistors in the power stage 1470, and by doing so, enables the error amplifier 1460 to control the output power of the power stage 1470. The inverting amplifier 1480 before the error amplifier 1460 increases the duty cycle and output power of the second discrete converter 1424 when the voltage to the motor drive electronics 1416 increases, to sink additional power from the motor drive electronics 1416, and deliver additional power to the input power buss 1412, which reduces the voltage to the motor drive electronics 1416. The power stage 1470 is configured as a flyback converter. Signal 1436 from the first error amplifier 1430 is coupled to the output of the error amplifier 1460 through controlled switching device 1434 to control when the second power converter 1424 is enabled. However, it is to be noted that these converters are not limited to a forward converter and a flyback converter; these examples are given to be illustrative, and not restrictive.

The above detailed description includes references to the accompanying drawings, which form a part of the detailed description. The drawings show, by way of illustration, specific embodiments can be practiced. These embodiments are also referred to herein as "examples." Such examples can include elements in addition to those shown or described. However, examples are contemplated in which elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference are considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical constraints on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is to allow the reader to quickly ascertain the nature of the technical disclosure, for example, to comply with 37 C.F.R. §1.72(b) in the United States of America. It is submitted with the understanding that it will not be used to interpret or limit the scope or meaning of the claims. Also, in the above Detailed Description, various features may be grouped together to streamline the disclosure. This in not meant to mean that an unclaimed disclosed feature is essential to any claim. Rather, inventive subject matter may lies in less than the features of a particular disclosed embodiment. Thus, the following claims are hereby incorporated into the Detailed Description, with each claim standing on its own as a separate embodiment. The scope of embodiments are determined with reference to the appended claims, along with the full scope of equivalents to which such claims are entitled.

What is claimed is:

1. A bidirectional low voltage power supply (LVPS), comprising:
    a first discrete converter for providing power from a power source to a load, the first discrete converter having a first power stage providing power conversion to deliver an output power form, and first control electronics, including a first error amplifier, for controlling the first power stage of the first discrete converter to regulate the voltage at the output of the first discrete converter to a first predetermined output voltage; and
    a second discrete converter for selectively recycling power from the output of the first discrete converter back to the power source, the second discrete converter having a second power stage providing power conversion to recycle the output power, and second control electronics, including a second error amplifier, for controlling the second power stage of the second discrete converter to regulate an input voltage at an input of the second discrete converter to a second predetermined output voltage;
    wherein, when the first error amplifier of the first control electronics detects that the voltage at the output of the first discrete converter exceeds the first predetermined output voltage, the first error amplifier drops a first output voltage, and, when the output voltage remains higher than the first predetermined output voltage, the first error amplifier drops the output voltage further, and sets a duty cycle of the first discrete converter to zero to disable the first converter; and
    wherein, when the second error amplifier of the second control electronics detect that the voltage at the input of the second discrete converter exceeds the second predetermined output voltage, the second error amplifier increases a second output voltage, enabling the second discrete converter to recycle power back to the power source.

2. The LVPS of claim 1, wherein the first error amplifier of the first control electronics, in response to detecting the first output voltage of the first discrete converter exceeds the first predetermined output voltage, drops the first output voltage, reducing the duty cycle of the first converter, and, when the first output voltage remains higher than the first predetermined output voltage, the first error amplifier drops the first output voltage further, setting the duty cycle of the first discrete converter to zero, disabling the first converter.

3. The LVPS of claim 2, wherein the second error amplifier of the second control electronics, in response to detecting the voltage at an input to the second discrete converter exceeds the second predetermined output voltage, increases the second output voltage, increasing the duty cycle of the second discrete converter from zero, and, when the input voltage remains higher than the second predetermined output voltage, the second error amplifier increases the second output voltage further, to enable the second discrete converter to recycle power.

4. The LVPS of claim 1, wherein, in response to the second error amplifier of the second control electronics detecting an input voltage at the second discrete converter is greater than the second predetermined output voltage, the duty cycle of the second discrete converter increases from zero as the second output voltage of the second error amplifier of the second control electronics rises high to enable the second discrete converter to recycle power.

5. The LVPS of claim 1, wherein the first discrete converter is coupled at an input to an input power source, and is coupled at the output to a power supply load.

6. The LVPS of claim 5, wherein the second discrete converter is coupled in parallel to the first discrete converter in an opposite orientation, wherein the input of the second discrete converter is coupled to the output of the first discrete converter and the output of the second discrete converter is coupled to the input of the first discrete converter.

7. The LVPS of claim 6, wherein the second discrete converter recycles power from the output of the first discrete converter to the input of the first discrete converter until the voltage at the output of the first discrete converter drops below the second predetermined output voltage; the second error amplifier of the second control electronics detects when the voltage at the output of the first discrete converter drops below the second predetermined output voltage, and, in response, the second output voltage of the second error amplifier of the second control electronics drops low, and, if the second output voltage remains lower than the second predetermined output voltage, drops sufficiently low to set a duty cycle of the second discrete converter to zero, disabling the second converter.

8. The LVPS of claim 7, wherein the first discrete converter remains disabled with a zero duty cycle until the voltage at the output of the first discrete converter drops below the first predetermined output voltage, the first error amplifier of the first control electronics detects when the voltage at the output of the first discrete converter drops below the first predetermined output voltage, and, in response, the first output voltage of the first error amplifier of the first control electronics of the first discrete converter rises high, increasing the duty cycle of the first discrete converter from zero, enabling the first discrete converter to provide output power, and regulate the voltage at the output of the first discrete converter to the first predetermined output voltage, until the voltage at the output of the first discrete converter again exceeds the first predetermined output voltage.

9. The LVPS of claim 8, wherein the first and second power converters may provide output power isolated from input power, or may provide output power that is not isolated from input power.

10. The LVPS of claim 9, wherein the voltage at the output of the first error amplifier of the first control electronics of the first converter is used as a signal to disable the second control electronics of the second converter when the output of the first error amplifier is sufficiently high for the first power converter to operate with a predetermined duty cycle to deliver power to the load, and to enable the second control electronics of the second converter when the output of the first error amplifier is sufficiently low for the first power converter to be disabled with zero duty cycle and cease to deliver power to the load, and wherein the first control electronics of the first converter further comprises circuitry to generate a signal from the output of the first error amplifier to be used as a signal to disable the second control electronics of the second converter when the output of the first error amplifier is sufficiently high for the first power converter to operate with a predetermined duty cycle to deliver power to the load, and to enable the second control electronics of the second converter when the output of the first error amplifier is sufficiently low for the first power converter to be disabled with zero duty cycle and cease to deliver power to the load.

11. The LVPS of claim 10, wherein the second discrete converter further comprises a second power stage and a second control electronics including a second error amplifier and circuitry coupled to the output of the first error amplifier of the first control electronics of the first converter, the output of the first error amplifier signaling the second control electronics of the second converter, including the second error amplifier and circuitry, to control a second operating state of the second discrete converter, and wherein the second discrete converter further comprises a second power stage and a second control electronics including a second error amplifier and circuitry coupled to the signal generated from the output of the first error amplifier of the first control electronics of the first converter, the signal generated from the output of the first error amplifier signaling the second control electronics of the second converter, including the second error amplifier and circuitry, to control the second operating state of the second discrete converter.

12. The LVPS of claim 11, wherein the second control electronics of the second converter includes a controlled switching device for controlling the second operating state of the second discrete converter in response to the signal from the first error amplifier of the first converter, wherein the controlled switching device is selected from a group consisting of a bipolar transistor, FET, comparator, optical coupler, operational amplifier, other controllable electronic switch and amplifier.

13. The LVPS of claim 12, wherein the second control electronics of the second converter further comprises an inverting amplifier or inverting amplifier function disposed between the output of the first discrete converter and the second power stage, either before or after the second error amplifier, for increasing the duty cycle of the second discrete converter, to sink additional power from the output of the first discrete converter, and to increase the power recycled back to the power source, when the first output voltage of the first discrete converter rises.

14. A method for providing a bidirectional low voltage power supply (LVPS), comprising:
    generating and regulating a first predetermined voltage at an output for driving motor drive electronics using a first error amplifier of a first discrete converter coupled to a power source;
    selectively recycling power from the output of the first discrete converter using a second error amplifier of a second discrete converter;
    detecting when the voltage at the output of the first discrete converter exceeds the first predetermined voltage; and
    in response to detecting the voltage at the output of the first discrete converter exceeding the first predetermined voltage, the output of the first error amplifier of the first control electronics drops low, setting the duty cycle of the first converter to zero, setting the first discrete converter to a disabled state, and via a signal generated from the output of the first error amplifier of the first control electronics, setting the second control electronics of the second discrete converter to an enabled state for recycling power sourced at the output of the first discrete converter back to the power source.

15. The method of claim 14 further comprising setting the first discrete converter in an enabled state and a second discrete converter for recycling power to an input power source to a disabled state in response to detecting the voltage at the output of the first discrete converter does not exceed the first predetermined voltage.

16. The method of claim 14 further comprising providing power from an input power source to an input of the first discrete converter.

17. The method of claim 14, wherein the detecting when the voltage at the output of the first discrete converter exceeds a first predetermined output voltage further comprises detecting when voltage on the output of the first discrete converter increases because of the motor sourcing power.

18. The method of claim 14, wherein the setting the first discrete converter to a disabled state and the setting the second discrete converter to an enabled state for recycling power sourced at the output of the first discrete converter further comprises returning power to an input power source.

19. The method of claim 14, wherein the voltage at the output of the first discrete converter exceeds the first predetermined voltage, and in response to detecting the voltage at the output of the first discrete converter exceeding the first predetermined voltage, the output of the first error amplifier of the first control electronics drops low, setting the duty cycle of the first converter to zero, setting the first discrete converter to a disabled state, and by means of a signal generated from the output of the first error amplifier of the first control electronics, with additional circuitry in the second control electronics of the second converter, setting the second discrete converter to an enabled state for recycling power sourced at the output of the first discrete converter back to the power source through a second power stage of the second discrete converter.

20. The method of claim 19 further comprising providing an inverting amplifier or inverting amplifier function in the second control electronics, either before or after the second error amplifier, between the output of the first discrete converter and the second power stage for increasing the duty cycle of the second discrete converter to sink additional power from the output of the first discrete converter to recycle more power back to the power source.

21. The method of claim 14 further comprising a controlled switching device for controlling an second operating state of the second discrete converter in response to the signal from the first error amplifier of the first converter, wherein the controlled switching device is selected from a group consisting of a bipolar transistor, FET, comparator, optical coupler, operational amplifier, other controllable electronic switch and amplifier.

22. A system for providing motor drive power, comprising:
an input power source for providing input power;
an active line filter, coupled to the input power source, for reducing ripple current reflected back to the input power source and providing unidirectional power flow;
an energy storage device disposed at an output of the active line filter for storing energy;
a low voltage power supply (LVPS), coupled to the output of the active line filter and energy storage device, the LVPS providing and regulating a predetermined voltage at the output of the LVPS;
motor drive electronics, coupled to the output of the LVPS, the motor drive electronics providing power from the output of the LVPS to drive a motor, the motor drive electronics providing bidirectional power from between a compressor motor and the LVPS;
wherein the LVPS further comprises:
a first discrete converter for driving motor drive electronics, the first discrete converter having first control electronics for controlling the first converter to provide and regulate a first predetermined voltage at output of the first discrete converter; and
a second discrete converter for selectively recycling power from the output of the first discrete converter;
wherein the first control electronics detects when the voltage at the output of the first discrete converter exceeds the first predetermined voltage and, in response to detecting the voltage at the output of the first discrete converter exceeding the first predetermined voltage, the output of the first error amplifier of the first control electronics drops low, setting the duty cycle of the first converter to zero, setting the first discrete converter to a disabled state, and by means of a signal generated from the output of the first error amplifier of the first control electronics, with additional circuitry in the second control electronics of the second converter, setting the second discrete converter to an enabled state for recycling power sourced at the output of the first discrete converter back to the power source via a second power stage of the second discrete converter.

23. A bidirectional low voltage power supply (LVPS), comprising:
a first discrete converter for driving motor drive electronics providing power to a load, the first discrete converter having a first power stage providing power conversion to deliver a a predetermined output power form, and first control electronics for controlling the first power stage of the first discrete converter to regulate the voltage at an output of the first discrete converter to a first predetermined output voltage; and
a second discrete converter for selectively recycling power from the output of the first discrete converter back to a power source, the second discrete converter having a second power stage providing power conversion to recycle output power, and second control electronics for controlling the second power stage of the second discrete converter to regulate the voltage at an input of the second discrete converter to a second predetermined output voltage;
wherein the first control electronics includes a first error amplifier to detect when the voltage at the output of the first discrete converter exceeds a threshold the first predetermined output voltage, and, in response to detecting the voltage at the output of the first discrete converter exceeding the threshold, the first output voltage of the first error amplifier of the first control electronics drops low, and, if the first output voltage remains higher than the first predetermined output voltage, drops sufficiently low to set a duty cycle of the first discrete converter to zero, disabling the first converter; and
wherein the second control electronics includes a second error amplifier to detect when the voltage at an input of the second discrete converter exceeds the second predetermined output voltage, and, in response, the second output voltage of the second error amplifier of the second control electronics rises high, increasing the duty cycle of the second discrete converter from zero, enabling the second discrete converter to recycle the power sourced at an input of the second discrete converter back to the power source.

* * * * *